United States Patent [19]
Mauric

[11] Patent Number: 5,199,789
[45] Date of Patent: Apr. 6, 1993

[54] IMMERSION WELL ASSEMBLY

[76] Inventor: Stanley J. Mauric, 1210 Roundhill Rd., Baltimore, Md. 21218

[21] Appl. No.: 615,623

[22] Filed: Nov. 19, 1990

[51] Int. Cl.$^5$ .......................... G01K 1/14; G01K 5/32
[52] U.S. Cl. ............................. 374/143; 236/DIG. 11; 337/2; 374/208
[58] Field of Search ............... 374/208, 201, 166, 110, 374/165, 143; 236/99 R, DIG. 11; 337/2

[56] References Cited

U.S. PATENT DOCUMENTS

| | | | |
|---|---|---|---|
| 1,775,682 | 9/1930 | Martin | 374/166 X |
| 2,015,838 | 10/1935 | Borden et al. | 374/166 |
| 2,161,432 | 6/1939 | Rees . | |
| 2,218,622 | 10/1940 | Rabezzana . | |
| 2,494,628 | 1/1950 | Oberding . | |
| 2,547,875 | 4/1951 | Krasnow | 374/143 X |
| 2,799,758 | 7/1957 | Hutchins | 374/208 X |
| 3,016,746 | 1/1962 | Holloway | 374/189 X |
| 3,081,631 | 3/1963 | Switzer, Jr. et al. . | |
| 3,154,947 | 11/1964 | Poshadel et al. . | |
| 3,281,518 | 10/1966 | Stroud et al. | 374/165 X |
| 3,435,400 | 3/1969 | Beckman . | |
| 3,439,356 | 4/1969 | Kinzer | 374/143 X |
| 3,596,518 | 8/1971 | Kirkpatrick | 374/166 X |
| 3,713,339 | 1/1973 | Medlar . | |
| 3,765,242 | 10/1973 | Bailleu . | |
| 3,923,552 | 12/1975 | Parris | 374/208 |
| 3,955,419 | 5/1976 | Barton et al. | 374/166 |
| 4,548,517 | 10/1985 | Kampmann | 374/143 |
| 4,560,973 | 12/1985 | Grimm et al. | 374/165 X |
| 4,575,705 | 3/1986 | Gotcher . | |
| 4,772,132 | 9/1988 | Hofmann | 374/143 |
| 4,830,515 | 5/1989 | Cortes . | |
| 4,886,371 | 12/1989 | Fondin | 374/165 X |
| 4,958,938 | 9/1990 | Schwartz et al. . | |
| 5,035,514 | 7/1991 | Newman | 374/164 |

OTHER PUBLICATIONS

Tech Tip, Johnson Controls, vol. 2, No. 3, 1990.
Hydronic Controls, pp. 312-313, 314, 320-322, Honeywell Tradeline Catalog 1985.
Remote Bulb Temperature Controls, pp. 233, 236, Honeywell Tradeline Catalog 1985.
Trerice, Bimetal Thermometers, Catalog 121, pp. 3-12, Jan. 1987.
Trerice, Industrial Thermometers, Catalog 110, pp. 110-3-110-11, Nov. 1986.
Weiss, Bi-Metal Thermometers, Catalog BM-280, pp. 2-7, Feb. 1980.
Conax, Temperature Sensors and Assemblies Seals for Wires and Probes, Catalogs 5000, pp. 1-45, Apr. 1988.
Weiss Industrial Thermometers Industrial Glass Catalog 977B, pp. 1-12, Oct. 1985.

Primary Examiner—Daniel M. Yasich
Attorney, Agent, or Firm—Banner, Birch, McKie & Beckett

[57] ABSTRACT

An immersion well assembly for a fluid vessel, such as a boiler, hot water heater or piping system, having an existing threaded opening. A preexisting well housing a mechanical temperature sensor, which is connected to a temperature display or control first system, is removed from the opening, and the present assembly threaded therein. In this assembly are a (replacement) mechanical sensor to be connected to the first system and an electronic sensor. The electronic sensor is positioned in a small distal pocket and the sensor wires travel along a groove adjacent the mechanical sensor and out to a second system, such as a remote computer control system.

45 Claims, 4 Drawing Sheets

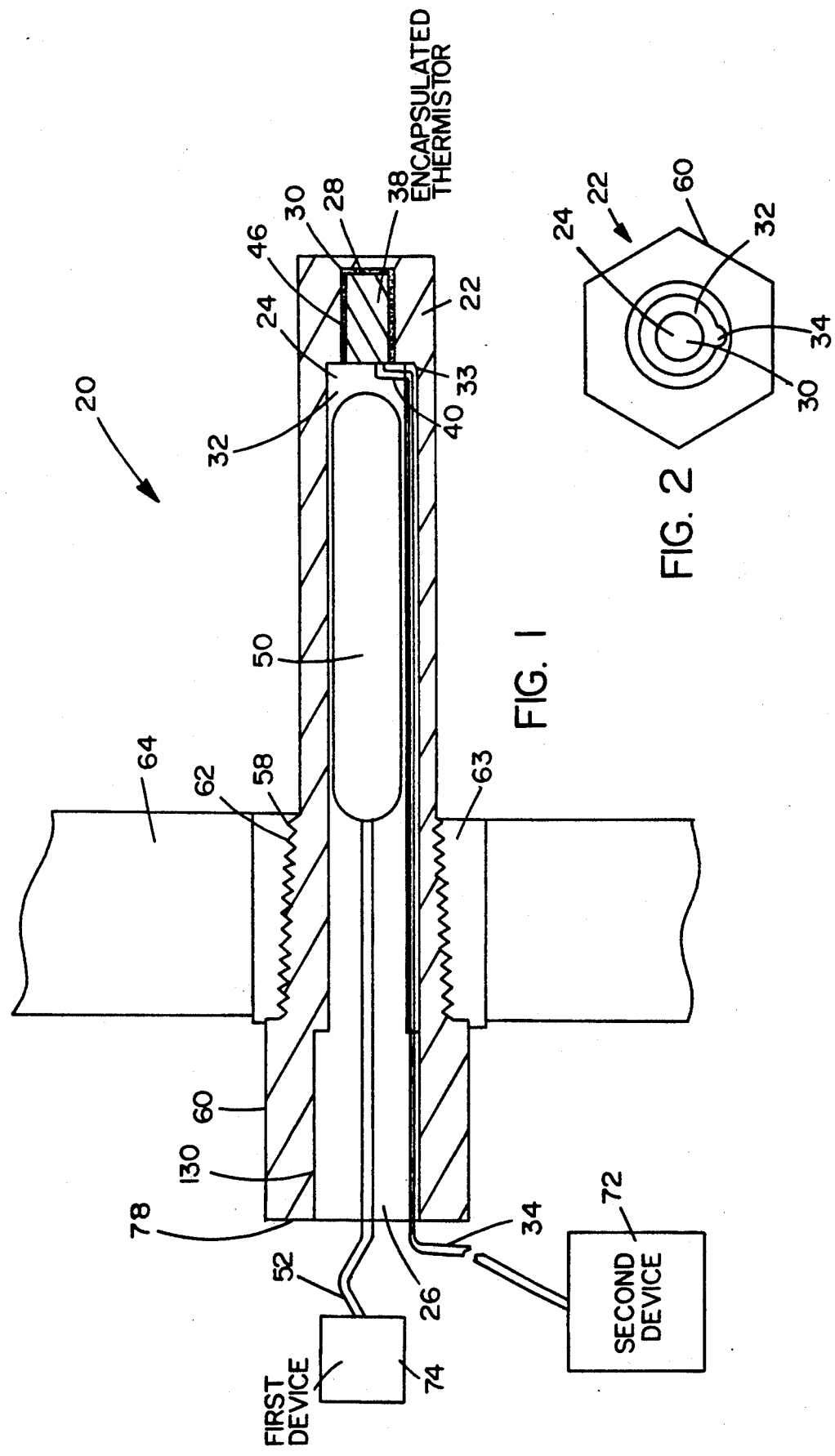

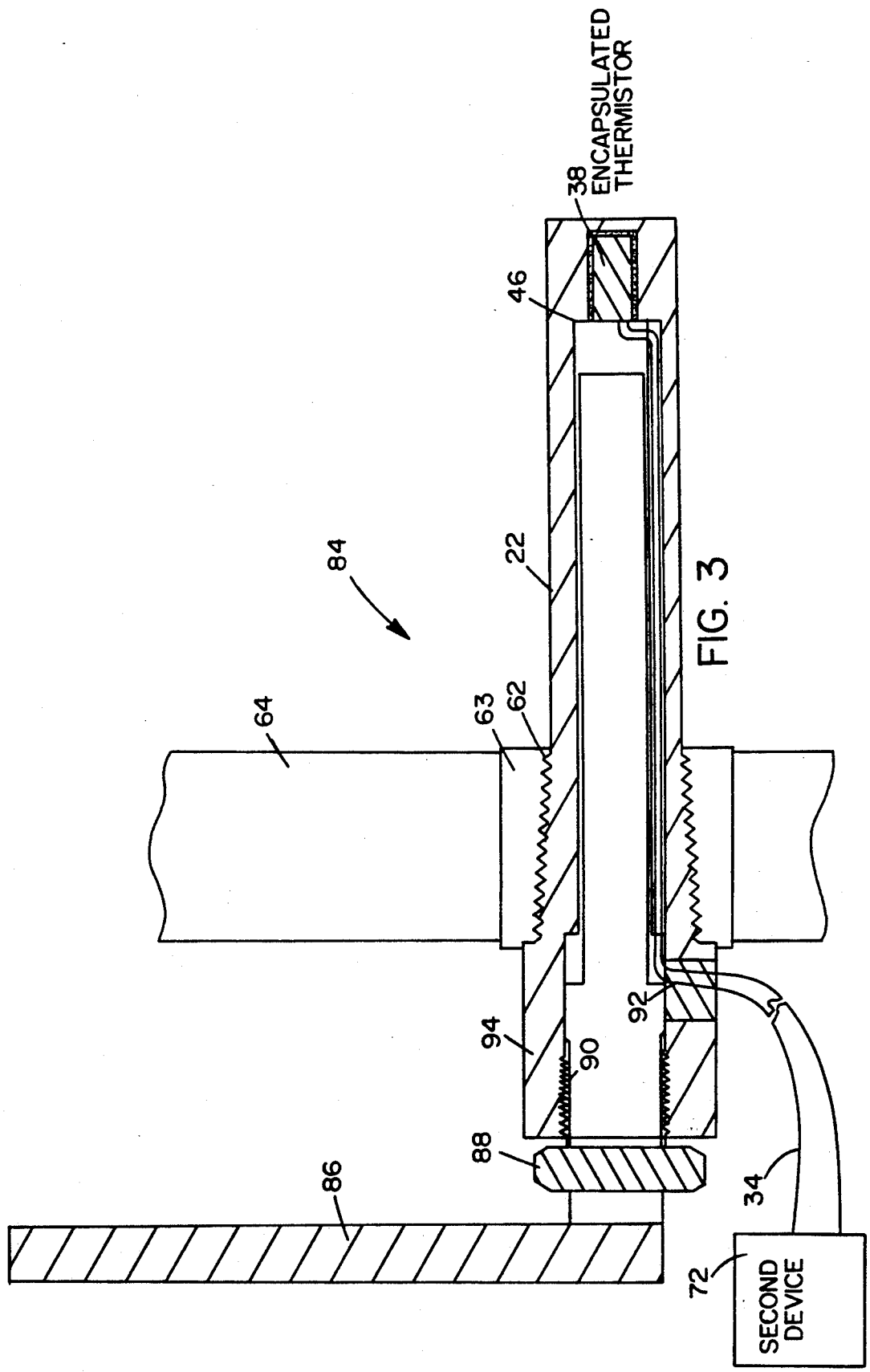

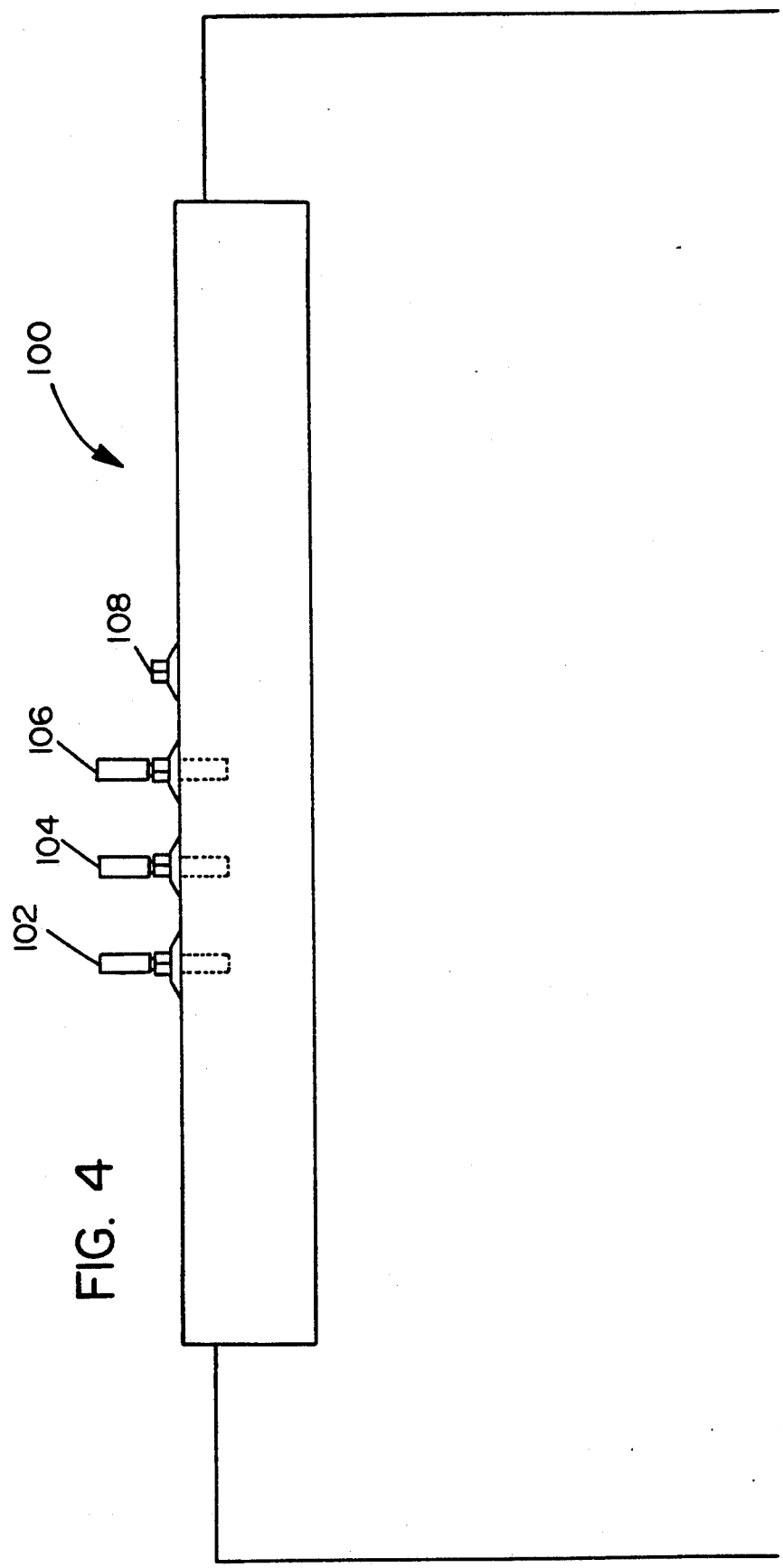

IMMERSION WELL ASSEMBLY

BACKGROUND OF THE INVENTION

The present invention relates to immersion wells used in boilers, hot water heaters and other fluid vessels. It more particularly relates to such immersion wells which house mechanical temperature sensors. It further relates to constructions of electronic temperature sensing and computer control or display systems for hot (or cold) fluid vessels.

It is often desirable to further control or automate an existing boiler or hot water system to make it more efficient and thus less expensive to run. Some type of (usually mechanical) temperature sensor is already provided on these vessels to control the burners when the temperature of the fluid in the vessel reaches a predetermined temperature. These systems typically are simple on/off systems and turn the burner on and off when the water reaches certain temperatures. There are three common ways of attaching the electronic sensor to an existing vessel to obtain a temperature indication for the control equipment to make the system more efficient.

One method is to burn a hole into the tank, weld a fitting at the hole, and thread the sensor housing into the fitting. As an example, a welder takes a Weld-o-let, which is a piece of metal or steel with a threaded interior, places it on top of the opening and then welds around it making an effective attachment and seal. This procedure is rather time-consuming and expensive, however, and requires special welding skills and workman certifications.

Another method is to strap a sensor onto a piping or other portion of the fluid system. Often the pipe is insulated so the insulation must first be removed according to this method, the exposed surface of the pipe cleaned, a heat transmitting paste applied thereon, the sensor stuck in the paste a strap placed around the entire pipe circumference clamping the sensor down and the insulation then replaced. It is thus the temperature of the surface of the pipe which is then sensed and not necessarily that of the fluid in the pipe. This surface temperature can not only differ from but also lag that of the fluid inside of the pipe at that location. Another disadvantage is that often the strapped-on sensor often is not and cannot be placed at the preferred location on the vessel near the strata of fluid whose temperature is preferably to be determined.

A third method of applying the electronic temperature sensor to an existing vessel is to insert it into an unused preexisting tapping. These tappings usually are not present, however, and when they are, they are often corroded shut.

SUMMARY OF THE INVENTION

Accordingly, it is a principal object of the present invention to provide an improved system for placing an electronic temperature sensor on an existing fluid vessel, which system accurately and quickly senses the temperature at the desired location in the fluid and which system can be installed quickly and relatively inexpensively.

Directed to achieving this object, an improved method for installing an electronic control system on a hot water vessel is herein provided. An existing well having a mechanical sensor is unthreaded from the vessel wall and an immersion well of the present invention is threaded into that vessel opening. This well comprises a tube having a longitudinal cavity with a small pocket at its distal end. An encapsulated thermistor surrounded by heat conductive paste is positioned in the pocket. The thermistor wire travels in a cavity wall groove and out the other end of the tube. A capillary bulb or other mechanical sensor is positioned in the cavity along the groove. The bulb is operatively connected to a first device such as a burner control or a thermometer. The thermistor in turn and through its wires is connected to a second device such as a computer control system or a local, digital temperature display. The thermistor is thus mounted in the desired place within the vessel fluid and without an additional vessel wall opening being needed to be formed.

Other objects and advantages of the present invention will become more apparent to those persons having ordinary skill in the art to which the present invention pertains from the foregoing description taken in conjunction with the accompanying drawings.

BRIEF DESCRIPTION OF THE DRAWINGS

FIG. 1 is a cross sectional view of a first immersion well assembly of the present invention shown threaded in position in a vessel wall.

FIG. 2 is an end elevational view of the tube member of the assembly of FIG. 1 illustrated in isolation.

FIG. 3 is a cross sectional view of a second immersion well assembly of the present invention shown threaded into place in a vessel wall.

FIG. 4 is a top plan view of a portion of a boiler using the immersion well assembly of FIG. 1.

DETAILED DESCRIPTION OF PREFERRED EMBODIMENTS OF THE INVENTION

Figure 5:
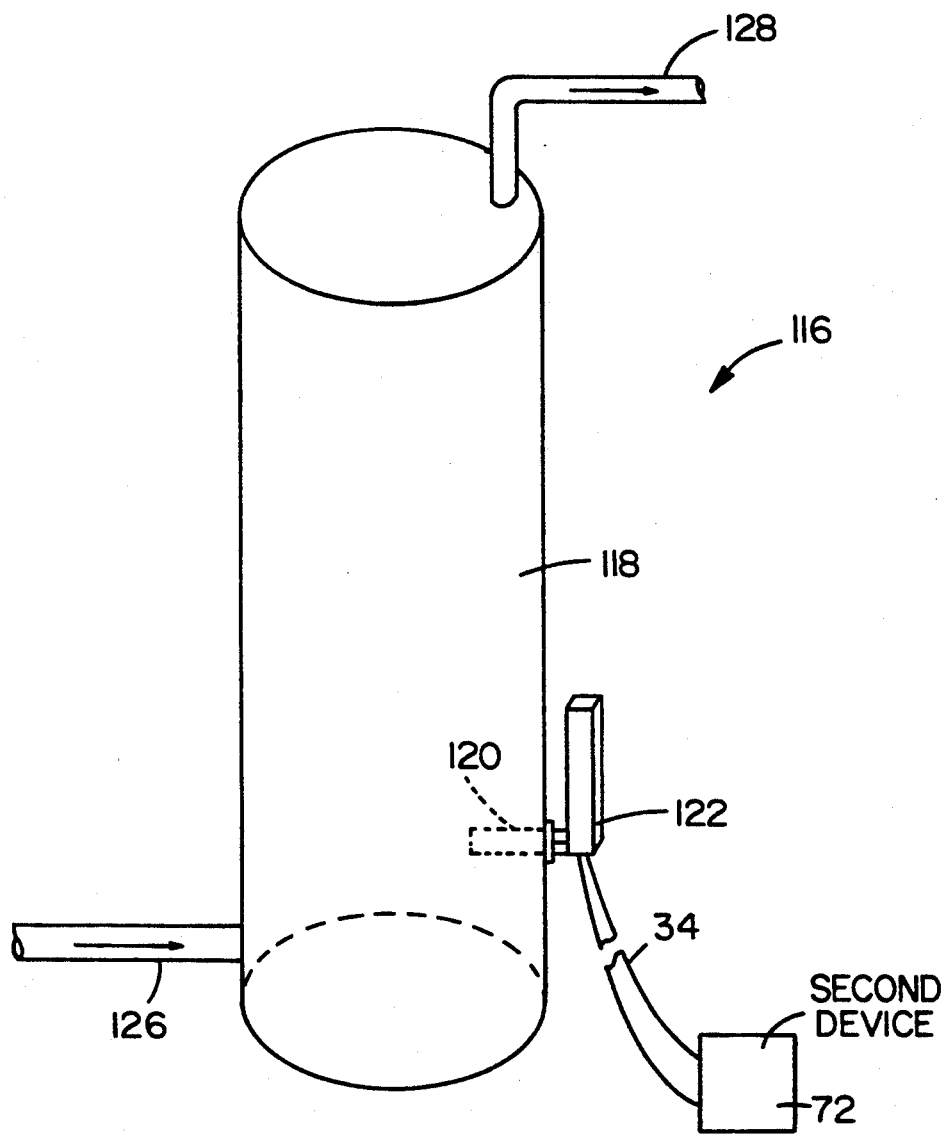
FIG. 5 is a perspective view of a hot water heater or storage tank using the immersion well assembly of FIG. 3.

Referring to FIG. 1 a first immersion well assembly of the present invention is illustrated generally at 20. This assembly 20 is shown to comprise a metal tube 22, whose manufacture will be described in detail later, defining a cavity 24 therewithin having an open end 26 and a closed end 28. A small (narrower diameter) pocket 30 is formed in the distal closed end 28 of the cavity 24. The main body 32 of the cavity 24 then extends substantially the rest of the length of the tube 22. A groove or half round 33 is formed the length of the main body cavity 22. The various diameters of the cavity 24 of the tube are best shown in the end view of FIG. 2.

An electronic sensor is positioned in the pocket 30, and its wires 34 extend along the groove 33. The wires 34 can be formed rigid along the groove portion to facilitate placement thereof in the groove 33. Adhesives can be used on the wire 34 and/or in the groove 33 to hold them therein. The electronic sensor 38 comprises a thermistor encapsulated in a small diameter tube epoxied at both ends, as is commercially available from others, and held with heat conductive paste 46 in the pocket 30. A copper thermometer bulb or other mechanical temperature sensor 50 is disposed in the main body portion 32 of the cavity 24. The bulb 50 typically has refrigerant gas in it, and a small copper tube 52 extending out from the bulb is connected to a switch. The switch has a dial which can be set to the desired temperature, such as 140° F., and with an adjustable variance of 10° for example. Thus, when the indicated temperature drops to 130°, the circuit is activated and kept running until it reaches 140° when it is then turned off. In lieu of or addition to the groove 33 a corresponding wire groove can be provided, formed on and along the bulb 50.

A threaded portion 58 is formed on the outer circumference of the tube 52 and wrench flats 60 provided at the proximal end of the tube adjacent the threaded portion. With the distal or closed end 28 inserted into a pre-existing threaded opening 62 through a vessel portin 63 of the vessel wall 64, a wrench (not shown) is placed on the wrench flats 60, the wrench turned and the threaded portion 58 thereby threaded into the opening to secure the assembly 20 in the wall opening. The fluid in the vessel (64) can be any type of fluid—cold or hot; it can be a liquid, a gas or even a volume of flowable particulate matter, such as beads or grain.

The wires 34 from the electronic sensor 38 are connected to a control system or local or remote display shown generically by a second device 72. An example of a controller or control system or second device 72 is the domestic hot ware controller available from Protemp Fluidmaster of California. The bulb 50 with refrigerant gas therein is connected by the copper capillary tube 52 to an existing control shown generically by a first device at 74, which can be mounted remotely or on the well, and can for example include a pneumatic controller. When mounted on the well it can be mounted on the surface 78. This surface 78 can be flat, as shown, or can be machined to accept the mounting hardware of the existing control (74). The existing control or first device 74 is wired so that it still operates the system in the event the computer of control 72 fails. For example, if a temperature of 140° in the system is the maximum desired temperature then the existing control 74 can be set at 145°. The existing control 74 then operates the system, and this control is broken with another relay that is controlled by the computer control 72. When applied to a piping system it is often necessary to drain the entire building down; that is, all the water in the system. In contrast, when the assembly is to be positioned in a boiler only the boiler needs to be drained down since it usually can be isolated. Although FIG. 5 shows a sectional hot water heater 100, the (three or four) openings 102, 104, 106, 108 can also be located in the side of a round boiler or a boiler having a square cover.

FIG. 3 shows generally at 84 another embodiment of the immersion well assembly of the present invention wherein the mechanical sensor 50 is attached to a local visual thermometer 86 (which comprises the first device 74) such as are often found on boiler room pipes. Examples of thermometers 86 are those manufactured by H. O. Trerice Co. of Detroit, Mich., and shown in its Catalog Nos. 121 and 110, and those manufactured by Weiss Instruments, Inc. of West Babylon, N.Y., and as shown in its Catalog No. 977B on page 3 and in Catalog No. BM-280. This thermometer 86, which includes a securing nut 88, is secured to the tube 22 by threading it into the interior threaded portions 90 at the end of the tube. Since the threaded portions 90 are along the wall of the cavity 24, the wires 34 from the electronic sensor 38 cannot travel therealong as they would be crushed and torn when the thermometer assembly is threaded into the tube 22. Accordingly, small holes 92 are drilled into the end head portion 94 of the tube 22 and a small slot is milled out through which the wires 34 pass. The sensor 38 can be a thermistor, as previously stated, that puts out a certain resistance value at various temperatures. There are a number of different kinds of thermistors commercially available which can be used with this system including those available from Protemp, Andover and Johnson Control Computer. The wires from this sensor 38 are then connected to the computer or local or remote display device 72. The existing thermometer sensing vessel 96 (50) is shown positioned in the cavity 24 directly behind the sensor 38. The present well assembly replaces the existing stationary well in this thermometer embodiment.

FIG. 4 shows a boiler 100 having three controls with an immersion well assembly 20 in each one of them and an additional tapped hole 108 which is often plugged or corroded shut. Often larger boilers have three controls—one is the operating control which turns it on, a second is a modulating fire controller and the third is a manual-rest high limit safety. When the boiler first turns on, the operating controls close. The boiler then goes through it s purge cycle clearing the chamber of combustion gases. If it has a modulating fire capability it goes into low fire, lights off, all the safeties check out making sure that it is running correctly and then it goes into high fire. An example of an existing modulating fire control is the Honeywell Model No. T991A. If the operating control is set at 180° F. and the modulating fire controller is set at 175°, the boiler will come on at 170°. The modulating fire control will attempt to reduce the firing rate of the boiler to try to maintain that temperature (175° F.). If it is at 170° after it goes through all of the safeties then the modulating fire controller sends a signal to the burner to be at full output. As the temperature approaches this setting, it will then slowly throttle the boiler down. If the load is equal to the point the burner is at then it will run continually at 175°, assuming the load that is being taken off the boiler is equal to what is being put in. If it is at low fire and the temperature is still increasing, then more heat is being put into the boiler than is being taken out, and when it reaches 180° it will shut off. In other words, as soon as the operating control reaches 180° the boiler 100 shuts off and the entire sequence starts again. Thus, energy management computer control systems such as control 72 are often now used to take over the function of the modulating fire control 104. These systems prevent a boiler which is in high fire from being shut off, which is a preferred operating strategy.

The immersion well assembly 20 of the present invention would be placed in either the operating controller opening 102 or the modulating fire control opening 104 and not in the manual high limit safety reset 106, which is not to be tampered with. If the temperature rises to the safety reset temperature than the boiler 100 is locked out and a button (not shown) must be physically pushed to get the system started again. Thus, the assembly (20, 84) of the present invention is placed in one of the two day to day operating controls 102 or 104 and not in the ultimate safety control 106. The safety control 106 might be set at 240° while the operating control is set at 180°, so that when the temperature reaches 240° the boiler is shut down and someone must determine why the operating controls did not function.

An example of a boiler 100 is the H B Smith Boiler having three predrilled, pretapped holes 102, 104, 106, such as three quarter inch National Pipe Threads. One control is a manual high limit preset 106, the second is the operating control 104, which puts out a resistance which a modulating motor attempts to match, and the third is the modulating fire control 102. Occasionally a fourth plugged hole 108 is provided in the boiler 100, but as previously stated the plug after time often cannot be removed therefrom as it and the surrounding Weld-o-let have rusted together. An example of an operating control 102 is the L6048 available from Honeywell. Examples of remote prior art controls 102 typically found in boilers and tanks and usable herein are the Honeywell L400 8A, B E, and the L600 8A remote bulb controllers, the Honeywell L400 6A, B, E, and L600 6A, B, C Aquastat Controllers.

FIG. 5 is a perspective view showing generally at 116 a water storage tank or water system of the invention. The cylindrical tank portion is shown by reference numeral 118, and an immersion well assembly 120 (20 or 84) of the present invention is shown installed in the tank 118. The existing control 122 (74 or 84) though shown mounted at the end of the tube could also be mounted remotely. The wires 34 from the sensor are similarly connected to a control computer or other local or remote display 72.

For a domestic hot water tank 118 the cold water comes in through a lower pipe 126 and hot water exits out a top pipe 128. Thus there will be some temperature stratification of the water within the tank 118. It is desirable to sense the temperature in the lower third of the tank in the area of the cold incoming water and thus that is where the present well is mounted. The square metal box sitting on the lower side of the hot water heater 118 has a dial whose temperature setting can be adjusted, as needed, with a screwdriver. The concept of the immersion well assembly of the present invention is thus essentially the same for both boilers and hot water heaters, though the temperature ranges therefor will typically differ.

The procedure for applying an electronic sensor 38 to an existing fluid vessel 64 is relatively easy pursuant to the present invention. The existing immersion well having a (mechanical) sensor therein is removed from its threaded opening 62 after the water has been sufficiently drained from the vessel 100, 118. An immersion well assembly 20 or 84 of the present invention is then threaded into place in this opening 62. After the sensor 38 has been placed in the pocket 30 and secured therein in heat conductive paste 46, the capillary tube or bulb 50 is positioned therein behind it. The thermal or heat conductive paste 46 prevents an insulating air gap between the sensor 38 and the surrounding metal pocket 30 from forming. The old control (74) associated with the bulb 50 is mounted back in place, and the wires 34 from the electronic sensor 38 are hooked up to the computer or control system 72. This assembly thus has not only the same or a replacement mechanical sensor 50 but also the new electronic sensor 38 therein. The sensor 38 and wires 34 can thus be positioned in the pocket 30 after the tube 22 via its threaded portion 58 has been threaded into the wall opening 62. Alternatively, the sensor 38 (and wire 34) can be first positioned (and held) in the pocket 30 and then the tube 22 threaded into position. In fact, the tube 22 and sensor 38 can be made and distributed as an assembled unit.

These sensors 38 are available from Protemp and Andover and can be obtained from a number of different suppliers. The sensor 38 is held in a quarter inch aluminum or stainless steel tube which is epoxied at both ends and the wires 34 exit the tube 22. The electronic sensor 38 creates a resistance value at a given temperature, and sends it signal fifty, 1,000 or 2,000 feet depending on where the brains of the computer 74 are located. The brains control another relay or switch which typically is aligned with the existing switch. This switch and the new relay which is to be controlled through the computer 74 are mounted in series. The existing switch is set a little higher than the maximum desired temperature. If the signal from the new system fails then the relay fails close and the control returns to the existing control 74.

Existing wells with capillary bulbs therein typically do not have sufficient room to insert an electronic sensor 38 therein. There is neither the pocket area for the sensor nor the space around the bulb out through which the sensor wire (34) can pass. Thus, it is desirable to manufacture a new tube (22) having the proper configuration and cavity diameters. A hexagonal or square stock brass, or stainless steel can be used for the tube 22. The end is machined off cylindrically, and the threads 58 are machined on. (An alternative method uses a cylindrical piece of metal and manufactures at least two spaced wrench flats 60 at the proximal end around and on which a wrench can grasp.) The small pocket hole 28 is drilled through the substantial extent of the tube 22, and then a larger hole 24 is drilled down to the start of the pocket. The diameter of the large cavity portion 46 is preferable 0.390 inch, while that of the pocket 38 is 0.260 inch. By having the sensors 50, 28 arranged longitudinally, as opposed to laterally or side-by-side, the diameter of the tube 22 can be maintained at a usable, workable dimension. Then a third larger diameter hole 130 is drilled down to provide for insertion clearances. Using a guide reamer the half moon shaped groove 33 is drilled, or a shaper is used to slice the groove out. It is preferable not to omit the groove 33 and simply make the diameter of the major cavity portion 32 larger, since this would increase the existing air space between the bulb 50 and the cavity wall. The space between the bulb 50 and the cavity wall should be only sufficient so that the bulb can be slid into place in the cavity 24. Another construction procedure of this invention makes the tube 22 according to injection molding technologies.

This immersion well assembly 20 or 84 is thus used to sense temperature through an existing penetration 62 in a boiler, tank or piping system and the existing control or visual thermometer is left intact and operating. The present assembly senses temperature for two different devices first device 74 and 74; the first 72 is an existing already present control and the second device 72 is some sort of computer. The temperature is being sensed electronically for the computer and mechanically for the existing control. The hot water controller 72 uses the information acquired from the electronic sensor 38 to more accurately monitor (or display) temperature and/or control the temperature of the water.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

What is claimed is:

1. A fluid vessel temperature sensing method, said method comprising the steps of:
   providing an immersion well assembly including an elongate member having a longitudinal cavity and first and second temperature sensors longitudinally arranged in the cavity and on a longitudinal axis of the cavity, wherein one of the first and second sensors is disposed in a distal pocket of the cavity;

threading the elongate member into a preexisting threaded opening in a wall of a fluid vessel and thereby into a threaded-in position; and when in the threaded-in position, the first sensor transmitting a temperature thereby sensed of fluid in the vessel to a first device and the second sensor transmitting a temperature thereby sensed of fluid in the vessel to a second device.

2. The method of claim 1 further comprising operatively connecting the second sensor to the second device, after said threading step.

3. The method of claim 1 further comprising the immersion well assembly defining a first immersion well assembly, and before said threading step, unthreading a second immersion well assembly that includes only one temperature sensing device from the threaded opening.

4. The method of claim 1 wherein the longitudinal axis is the central longitudinal axis of the cavity and the first and second sensors are longitudinally spaced from one another on the central longitudinal axis.

5. The method of claim 1 wherein the first sensor comprises a pressure bulb temperature sensor and the second sensor comprises an electronic temperature sensor.

6. The method of claim 1 further comprising the second sensor comprising an electronic temperature sensor and the electronic temperature sensor transmitting a temperature signal along a wire running along a groove of the cavity to the second device.

7. The method of claim 1 further comprising operatively connecting the first sensor to the first device after said threading step.

8. The method of claim 1 further comprising operatively connecting the first sensor to the first device before said threading step.

9. The method of claim 1 wherein the elongate member, when in the threaded-in position, physically isolates both of the sensor from the fluid of the fluid vessel.

10. The method of claim 1 further comprising, after said threading step, inserting the first sensor into the longitudinal cavity.

11. An immersion well assembly, comprising:

an elongate member having a portion configured to be secured into an opening in a wall of a fluid vessel such that said elongate member extends, when thereby in a secured-in position, into the fluid vessel and into fluid therein, said elongate member having a longitudinal cavity, and said cavity having a cavity central longitudinal axis;

a fluid-containing first temperature sensor which senses the temperature of fluid in the fluid vessel by the change in pressure of the fluid of said first sensor, with said elongate member in the secured-in position, and transmits the temperature-indicating pressure change to a first device, said first sensor being on the longitudinal axis and in said cavity;

an electronic second temperature sensor which senses the temperature of fluid in the fluid vessel generally at the same time as said first sensor senses the temperature, with said elongate member in the secured-in position, and transmits an electrical signal representative of the temperature sensed by said second sensor to a second device, said second sensor being on the longitudinal axis and in said cavity, and disposed distally relative to said first sensor; and a wire connecting said second sensor to the second device and along which the signal is transmitted, said wire passing within said elongate member and along said first sensor.

12. The assembly of claim 1 wherein the first device comprises a pneumatic control.

13. The assembly of claim 1 wherein said second sensor comprises a thermistor.

14. The assembly of claim 13 wherein said first sensor comprises a fluid bulb.

15. The assembly of claim 1 wherein said first sensor is operatively connected via a capillary tube to the first device.

16. The assembly of claim 1 wherein said elongate member is formed in a machining process.

17. The assembly of claim 1 wherein said elongate member is formed in an injection molding process.

18. The assembly of claim 1 wherein said cavity has a proximal cavity portion in which said first sensor is disposed and a distal cavity portion in which said second sensor is disposed, said distal cavity portion having its body diameter being smaller than that of said proximal cavity portion and its longitudinal length being less than that of said proximal cavity portion.

19. The assembly of claim 1 wherein said second sensor is longitudinally spaced in said cavity a distance from said first sensor.

20. The assembly of claim 1 wherein said portion of said elongate member comprises a threaded outside portion configured for threading into the opening.

21. The assembly of claim 20 wherein said elongate member includes an exterior wrench flat portion disposed proximally of said threaded outside portion.

22. The assembly of claim 1 wherein said elongate member, when in the secured-in position, physically isolates said first and second sensors from the fluid of the fluid vessel.

23. The assembly of claim 1 wherein said immersion well assembly when operated has no moving mechanical parts in said cavity.

24. The assembly of claim 1 wherein said elongate member, when in the secured-in position, is fixed to the fluid vessel and both are stationary.

25. The assembly of claim 1 wherein said first sensor comprises a copper thermometer bulb.

26. The assembly of claim 1 wherein said cavity includes a cavity longitudinal body portion and a cavity distal pocket.

27. The assembly of claim 26 wherein said pocket has a smaller maximum diameter than that of said body portion.

28. The assembly of claim 27 wherein the pocket maximum diameter is approximately 0.260 inch and the body portion maximum diameter is approximately 0.390 inch, and said first sensor comprises a pressure bulb.

29. The assembly of claim 26 wherein said second sensor is disposed in said pocket.

30. The assembly of claim 11 wherein the second device comprises a computer control system for controlling the temperature of the fluid of the fluid vessel.

31. The assembly of claim 11 wherein the first device comprises a temperature indicator.

32. The assembly of claim 31 wherein the temperature indicator is selected from the group consisting of digital, analog, local, LED and LCD readouts.

33. The assembly of claim 31 wherein the temperature indicator comprises a visual-indicating thermometer.

34. The assembly of claim 1 wherein said elongate member comprises an elongated tubular member.

35. The assembly of claim 1 wherein said first sensor comprises a pressure bulb sensor.

36. The assembly of claim 1 wherein said second sensor is spaced a distance distally from said first senor.

37. The assembly of claim 1 wherein said elongate member includes an internal groove and said wire is disposed at least partially in said groove.

38. The assembly of claim 37 wherein said groove opens up along its length into said cavity.

39. The assembly of claim 1 wherein said cavity includes a longitudinal wall groove and said wire is disposed in said groove.

40. The assembly of claim 39 wherein said groove is drilled out of a wall of said cavity.

41. The assembly of claim 39 wherein said groove is sliced out of a wall of said cavity.

42. The assembly of claim 1 wherein said elongate member is constructed of a heat conducting material.

43. The assembly of claim 42 wherein said heat conducting material is selected from the group consisting of brass, stainless steel, monel and titanium.

44. The assembly of claim 11 wherein said second sensor comprises an encapsulated thermistor and a thermal conductive paste surrounding said thermistor.

45. The assembly of claim 11 wherein the fluid vessel is selected from the group consisting of boilers, pipes, storage tanks, heat exchangers and hot water heaters.

* * * * *